(12) United States Patent
Jacobsen

(10) Patent No.: US 6,478,436 B1
(45) Date of Patent: Nov. 12, 2002

(54) SENSING MIRROR POSITION IN A POWERED MIRROR POSITIONING SYSTEM

(75) Inventor: Peter M. Jacobsen, Oakland Township, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/862,930

(22) Filed: May 22, 2001

(51) Int. Cl.$^7$ ................................................ G02B 7/182
(52) U.S. Cl. ...................................... 359/877; 248/480
(58) Field of Search ................................ 359/872, 873, 359/874, 876, 877; 248/479, 480

(56) References Cited

U.S. PATENT DOCUMENTS

| | | | | |
|---|---|---|---|---|
| 4,504,117 A | * | 3/1985 | Mittelhauser | |
| 4,818,090 A | * | 4/1989 | Righi | |
| 4,909,560 A | * | 3/1990 | Ginn | 296/65.1 |
| 4,915,493 A | * | 4/1990 | Fisher et al. | |
| 5,280,981 A | * | 1/1994 | Schulz | 294/106 |
| 6,352,007 B1 | * | 3/2002 | Zhang et al. | 74/512 |

* cited by examiner

*Primary Examiner*—Mark A. Robinson
(74) *Attorney, Agent, or Firm*—Roger A. Johnston

(57) ABSTRACT

An axial lead screw having one end pivotally connected to a rearview mirror is threadedly engaged by a motor driven worm gear, which upon rotation effects axial movement of the lead screw. A pair of flux collectors are disposed on opposite sides of the lead screw adjacent the distal end. A Hall effect sensor is disposed in one of the flux collectors. The distal end of the lead screw is magnetized and the Hall effect sensor provides a signal indicative of the lead screw movement. In one embodiment, the lead screw is magnetized; and, in another embodiment a permanent magnet is inserted in a bore in the distal end of the lead screw.

13 Claims, 2 Drawing Sheets

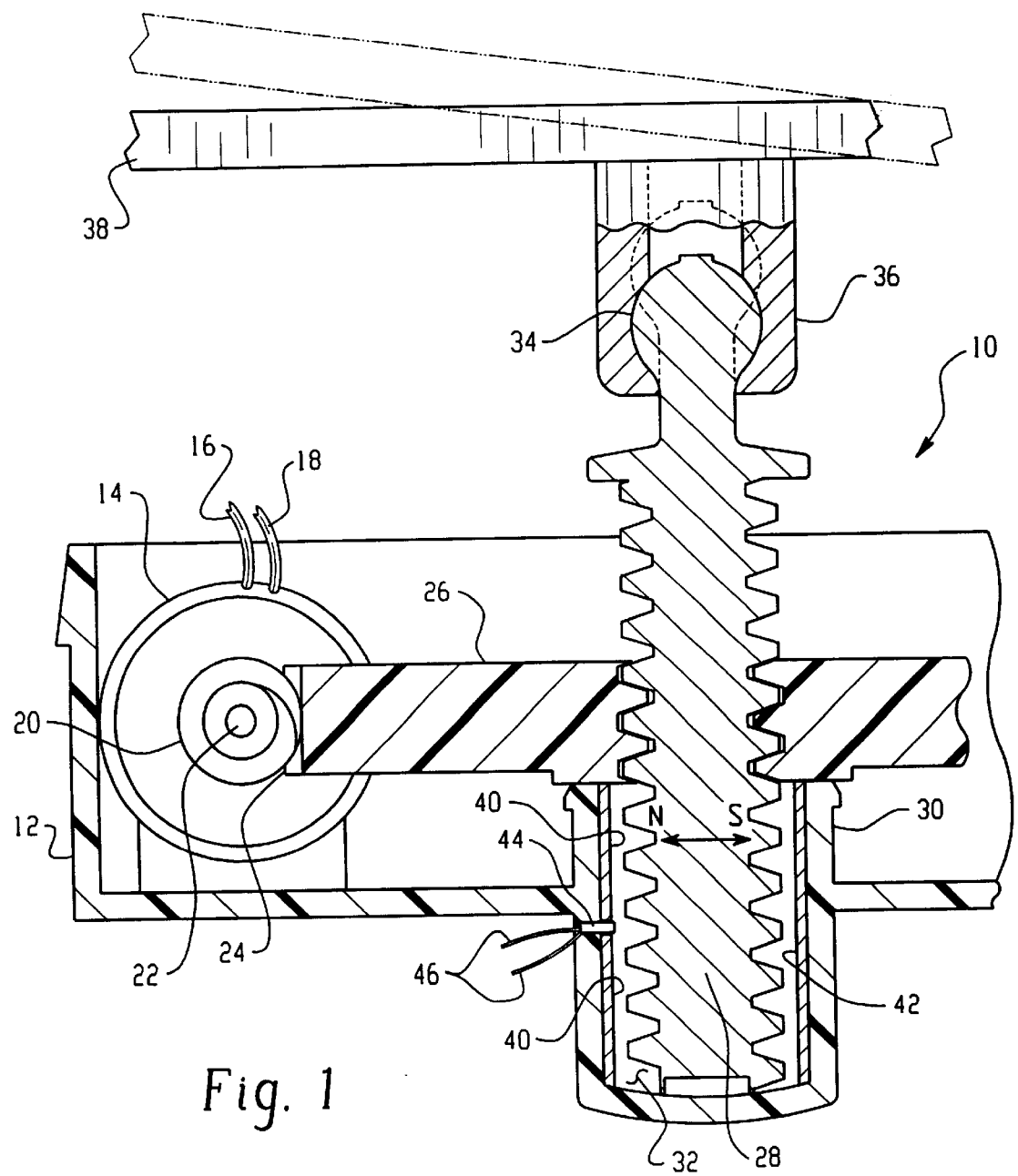
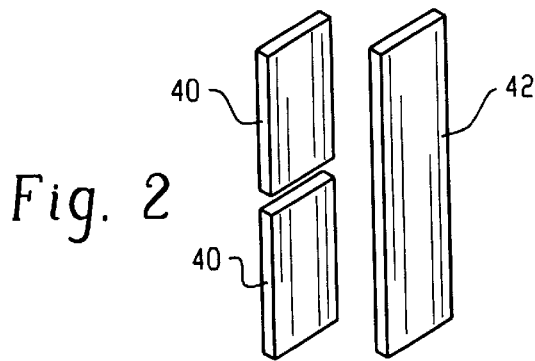
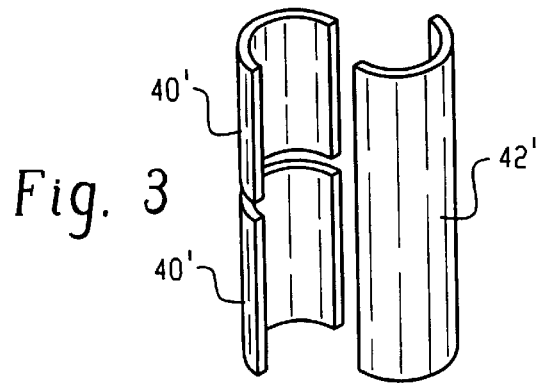

SENSING MIRROR POSITION IN A POWERED MIRROR POSITIONING SYSTEM

BACKGROUND OF THE INVENTION

The present invention relates to powered systems for adjusting the position of a motor vehicle rearview mirror and particularly relates to such systems where it is desired to automatically move the mirror to a predetermined position in response to a sensed condition. Such automatic mirror adjustment systems are employed to adjust the mirrors outwardly to a predetermined setting for the particular driver identified by an individual code for that driver inputted to the mirror control system through insertion of the key in the ignition switch and also for lowering the mirrors to cover the ground adjacent and behind the vehicle upon the vehicle being placed in reverse gear for backing.

The need for accuracy in positioning the mirror to a predetermined position is paramount in such automatic mirror adjustment systems; and, accordingly there is a need for a sensor to determine the instantaneous position of the mirror and provide an output signal which may be used by the controller to generate a drive signal for the mirror adjustment servo motor.

Heretofore, it has been common practice to use a potentiometer or variable resistor to provide a mirror position feedback signal to the controller in such automatic mirror positioning systems. However, problems have been encountered with the use of potentiometers as a result of variations in ambient temperature affecting the resistance of the element in the potentiometer. Furthermore, in order to achieve the accuracy desired it has been necessary to use precision resistive material in the potentiometer and this has been prohibitively costly for high volume passenger and light truck motor vehicle mirror systems. In addition, the potentiometer has exhibited relatively low reliability because of contact wear.

Thus, it has been desired to provide a way or means of improving the accuracy of a mirror position sensing function in an automatic vehicle rearview mirror positioning system and to provide such a system which is low in manufacturing cost and easy to manufacture and assemble.

BRIEF SUMMARY OF THE INVENTION

The present invention provides an integrally mounted position sensor in a rearview mirror actuator for providing an electrical signal output indicative of the position or movement of the actuator for effecting adjustment of a vehicle rearview mirror. The sensor arrangement of the present invention utilizes a magnetized lead screw for actuating mirror movement with ferromagnetic pole pieces or flux concentrators disposed adjacent the lead screw. A Hall effect sensor, the output of which is proportional to axial movement of the lead screw is disposed between the flux collectors. The sensor arrangement of the present invention is provided in the mirror actuator housing with a minimum of redesign or modification to existing designs.

BRIEF DESCRIPTION OF THE DRAWINGS

FIG. 1 is a cross-section of the assembled mirror actuator drive mechanism;

FIG. 2 is a perspective view of one embodiment of the flux collectors employed in the assembly of FIG. 1;

FIG. 3 is a view similar to FIG. 2 of an alternate embodiment of the flux collectors; and, FIG. 4 is a view similar to FIG. 1 of an alternate embodiment of the invention.

DETAILED DESCRIPTION OF THE INVENTION

Figure 4:
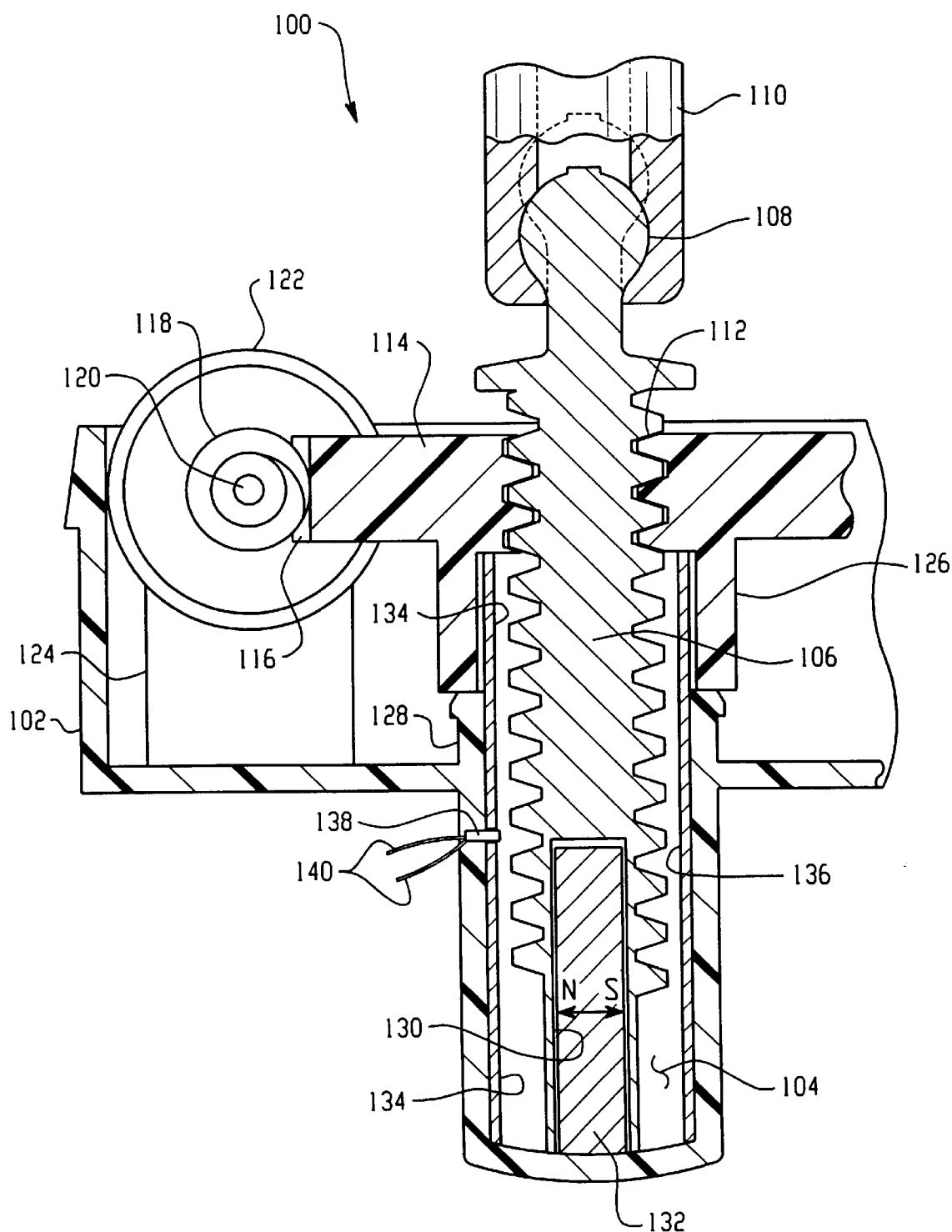

Referring to FIG. 1, a mirror adjustment or actuator system is indicated generally at 10 and includes a housing 12 having a motor 14 mounted therein energizable through electrical leads 16, 18 from a suitable on-board controller (not shown). The motor 14 has an output shaft 22 with a drive worm 20 thereon which engages the teeth 24 of a worm gear 26 which is threadedly engaged on a lead screw 28 for effecting axial movement of the lead screw 28 upon relative rotation of gear 26 with respect thereto. Worm gear 26 is rotatably registered against the end of a hub 30 provided on the interior of the housing and which may be formed integrally therewith. Hub 30 has a bore or cavity 32 formed therein into which one end of lead screw 28 extends; and, the lead screw is located or registered against the closed end of the hub 28 at its lower end in its lower-most position as shown in solid outline in FIG. 1.

The upper end of the lead screw extends beyond the worm gear 26 and has a spherical pivot surface 34 formed on the upper end thereof over which is pivotally engaged a pivot mount 36 which is attached to the backside of the rearview mirror 38. It will be understood that the lead screw is moveable upwardly, upon rotation of worm gear 26, to the position shown in dashed outline in FIG. 1.

Referring to FIGS. 1 and 2, a set of oppositely disposed flux collectors denoted by reference numerals 40, 42 are shown spaced on opposite sides of the lead screw 28. The flux collector denoted by reference numeral 40 is formed in two segments disposed in axially spaced arrangement on one side of the lead screw 28. A Hall effect sensor 44 is disposed between segments 40 and has external leads 46 which extend through and outwardly of the hub 30 for external electrical connection to the controller (not shown).

In the embodiment of FIG. 1 lead screw 28 is magnetized such that the poles thereof are disposed transversely of the axis of the lead screw as indicated by the letters N–S in FIG. 1. It will be understood that axial movement of the magnetized lead screw effects changes in the magnetic field within the flux collectors 40, 42; and, this change is detectable by the Hall effect sensor 44.

Thus, the present invention provides a simple non-contacting and relatively low cost way of providing an electrical signal accurately indicative of the movement of the positioning actuator for a pivotally mounted rearview mirror in a manner which provides a signal suitable for automatic positioning control of the mirror to a predetermined position.

Referring to FIG. 3, an alternative form of the flux collectors is shown wherein each of the collectors 40', 42' has a generally partially cylindrical configuration for increasing the amount of ferromagnetic material in the flux collector adjacent the lead screw 28.

Referring to FIG. 4, an alternate embodiment of the invention is illustrated at 100 having a housing 102 with a recess or cavity formed in the bottom thereof as denoted by reference numeral 104. A lead screw 106 is disposed therein which extends upwardly of the housing with a pivot surface 108 formed on the upper end thereof, which surface 108 is pivotally engaged by a stanchion 110 which it will be understood is attached to a mirror (not shown) and extending downwardly therefrom as in the embodiment of FIG. 1.

Lead screw 106 is threadedly engaged by internal threads 112 formed on the inner periphery of a driven worm gear 114 which has teeth 116 on the outer periphery thereof. A worm 118 is mounted on the output shaft 120 of drive motor 122 which is mounted on a support 124 provided in the housing; and, worm 118 is driving engaged with teeth 116 of worm gear 114. Worm gear 114 has a hub 126 provided thereon which is rotationally registered against an annular extension 128 formed in the bottom of the housing 102.

Lead screw 106 has a bore 130 formed in the lower end thereof into which bore is disposed a permanent magnet 132 which it will be understood is magnetized in a direction transverse to the axis of the lead screw 106 as shown by letters N–S in FIG. 4.

A set of flux collectors denoted by reference numerals 134,136 are disposed on opposite sides of the lead screw in circumferentially spaced arrangement and may be constructed in the manner of either FIG. 2 or FIG. 3. The flux collectors 134 on a common side of the lead screw are axially spaced with a Hall effect sensor 138 disposed therebetween. Electrical leads 140 from sensor 138 extend through the housing cavity and outwardly thereof for connection to an electronic controller (not shown).

The magnet 132 is moved axially with the lead screw 106 upon rotation of gear 114 by motor worm 118 to effect vertical movement of the pivot surface 108 to the position shown in dashed line in FIG. 4. This vertical movement of the lead screw causes changes in the magnetic flux in the flux collectors 134, 136 in the same manner as in the embodiment of FIG. 1; and, the Hall effect sensor 138 is operative to provide an electrical indication of the movement of the lead screw which indication is detectable by suitable electronic circuitry (not shown). The embodiment of FIG. 4 thus eliminates the need for magnetizing the lead screw and provides a separate permanent magnet which may be mounted therein for simplification of manufacturing. The present invention thus provides a relatively simple, non-contacting, low cost way of providing a mirror actuator position signal for use in an automatic mirror positioning system.

Although the invention has hereinabove been described with respect to the illustrated embodiments, it will be understood that the invention is capable of modification and variation and is limited only by the following claims.

What is claimed is:

1. A mirror position sensing system comprising:
    (a) a mirror housing;
    (b) a mirror mounted for pivotal movement in said housing;
    (c) a motor associated with said housing;
    (d) an actuator member operatively connected for effecting said mirror movement, said actuator having oppositely disposed magnetic poles thereon;
    (e) drive means operatively connecting said actuator member with said motor;
    (f) a conductive member disposed adjacent said actuator with a pair of flux collectors adjacent the conductive member; and,
    (g) circuit means connected to said conductive member operative for detecting the change in electrical signal generated by movement of said actuator magnetic pole with respect to said conductive member.

2. The mirror sensing system defined in claim 1, wherein said conductive member comprises a Hall effect sensor.

3. The system defined in claim 1, wherein said drive means includes an axial lead screw and gear-set speed reducer.

4. The system defined in claim 1, wherein said drive means includes a helical thread and a driven gear rotatably engaging said thread.

5. The system defined in claim 1, wherein said actuator includes an axial lead screw.

6. The system defined in claim 1, wherein said actuator includes an axial lead screw having a permanent magnet disposed for axial movement therewith.

7. A method of indicating the position of a power adjusted mirror comprising:
    (a) mounting a mirror for pivotal movement on a housing;
    (b) connecting a motorized actuator to the mirror;
    (c) providing a pair of oppositely disposed magnetic poles on the actuator;
    (d) disposing a conductive member adjacent said actuator and disposing a pair of flux collectors adjacent said conductive member,
    (e) sensing the electric signal generated in said conductive member by the movement of said actuator magnetic poles; and,
    (f) detecting the change in sensed electric signal as an indication of actuator movement.

8. The method defined in claim 7, wherein the step of connecting a motorized actuator to the mirror includes disposing an axial lead screw between a motor and the mirror.

9. The method defined in claim 7, wherein the step of connecting a motorized actuator to the mirror includes rotating a motor driven gear on an axial lead screw.

10. The method defined in claim 7, wherein the step of connecting a motorized actuator includes providing a spherical surface on one end of an axial lead screw and disposing a socket on the mirror and pivoting the spherical surface in the socket.

11. A method of indicating the position of a power adjusted mirror comprising:
    (a) mounting a mirror for pivotal movement on a housing;
    (b) connecting a motorized actuator to the mirror,
    (c) providing a pair of oppositely disposed magnetic poles on the actuator and disposing a flux collector adjacent each of the magnetic poles;
    (d) disposing a conductive member adjacent said actuator;
    (e) sensing the electric signal generated in said conductive member by the movement of said actuator magnetic poles; and,
    (f) detecting the change in sensed electric signal as an indication of actuator movement.

12. The method defined in claim 11, wherein the step of providing a pair of magnetic poles includes disposing a permanent magnet in an axial lead screw.

13. The method defined in claim 11, further comprising disposing at least one flux collector adjacent said magnetic poles.

* * * * *